United States Patent
Chiu

(10) Patent No.: US 7,158,267 B2
(45) Date of Patent: Jan. 2, 2007

(54) METHOD FOR GENERATING CALIBRATION CURVE

(76) Inventor: Chui-Kuei Chiu, 215, Sec. 1, Heng-Shan St., Heng-Shan Tsun, Heng-Shan Hsiang, Hsin-Chu (TW)

( * ) Notice: Subject to any disclaimer, the term of this patent is extended or adjusted under 35 U.S.C. 154(b) by 872 days.

(21) Appl. No.: 10/233,592

(22) Filed: Sep. 4, 2002

(65) Prior Publication Data

US 2004/0042050 A1    Mar. 4, 2004

(51) Int. Cl.
*H04N 1/00*    (2006.01)
*H04N 1/46*    (2006.01)
*H04N 9/64*    (2006.01)
*G06K 9/38*    (2006.01)
*H01L 27/00*   (2006.01)

(52) U.S. Cl. .................... 358/406; 358/504; 382/274; 250/208.1

(58) Field of Classification Search ............... 358/406, 358/504; 382/274, 272, 270; 348/251; 250/208.1
See application file for complete search history.

(56) References Cited

U.S. PATENT DOCUMENTS 5,801,962 A * 9/1998 Sheu et al. .................. 702/85

* cited by examiner

*Primary Examiner*—Twyler M. Lamb
*Assistant Examiner*—Houshang Safaipour
(74) *Attorney, Agent, or Firm*—Berkeley Law & Technology Group, LLC

(57) ABSTRACT

A method for generating a calibration curve is disclosed. The method comprises the following steps. Calibration data of one line image of a previous scan are first provided. Reference pixels are selected from the image line. Then a calibration board is scanned and calibration data of the reference pixels are generated. Calibration data of the reference pixels of a previous scan are then selected from the calibration data of one image line of a previous scan. Ratios of the calibration data of the reference pixels and the calibration data of the reference pixels of a previous scan are calculated. Calibration data of all pixels of the image line are finally generated by multiplying the calibration data of the image line of a previous scan and the ratios.

12 Claims, 3 Drawing Sheets

METHOD FOR GENERATING CALIBRATION CURVE

BACKGROUND OF THE INVENTION

1. Field of the Invention

The present invention relates to a method for generating a calibration curve, and more particularly to a method for generating a calibration curve by selecting reference points of one image line instead of all points.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In a conventional image scanner, calibration is necessarily performed before scanning images. This is because the conditions of the components of an image scanner usually alter in every scanning. For example, the brightness of the light source comprising a cold-cathode fluorescent lamp (CCFL) usually varies with duration of turn-on, environment temperature, and even its location. Moreover, linear image sensors such as CCD will not be identical and always respond differently to the same light signal. A total white calibration board or a full black calibration board is conventionally used to generate a shading curve or calibration curve. By scanning the white calibration board or the full black calibration board, an user can obtain a calibration curve showing how the bright level of the generated image varies with pixel positions of one image line. The data of this calibration curve are then used to calculate or to generate calibration data corresponding to each image sensor or CCD. However, the above mentioned calibration method has some troubling drawbacks. For example, a linear image sensor array may have many sensors or may be 10,000 sensors for each of red, green and blue (RGB) colors constituting one image line. If 32 image lines are chosen to generate calibration curves, then there are 10,000 (pixels)× 3(RGB)×32(lines)=960,000 pixels to be processed. Each pixel comprises 1 to 2 bytes of data and each byte represents a level value from 0 to 255. It is apparent that such a huge data quantity to be processed would drag the speed and performance of an image scanner. Some conventional image scanners skip generating a calibration curve before every scanning and utilize the previous calibration curve to generate calibration data. However, the previous calibration curve always differs from the present calibration curve since the conditions of the components of an image scanner usually alter in every scanning.

Hence it is desirable to provide a method for generating a calibration curve so as to render an operator or a manufacturer of an image scanner easier and more effective to calibrate images generated by the image scanner.

SUMMARY OF THE INVENTION

It is therefore an object of the invention to provide a method for generating a calibration curve with minimum calibration data necessary to be processed.

It is another object of this invention to provide a method for generating a calibration curve with high efficiency and performance.

To achieve these objects, and in accordance with the purpose of the invention, the invention provides a method for generating a calibration curve. The method comprises the following steps. Calibration data of one image line of a previous scan are first provided. Reference pixels are selected from the image line. Then a calibration board is scanned and calibration data of the reference pixels are generated. Calibration data of the reference pixels of a previous scan are then selected from the calibration data of one image line of a previous scan. Ratios of the calibration data of the reference pixels and the calibration data of the reference pixels of a previous scan are calculated. Calibration data of all pixels of the image line are finally generated by multiplying the calibration data of the image line of aprevious scan and the ratios.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method described below does not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
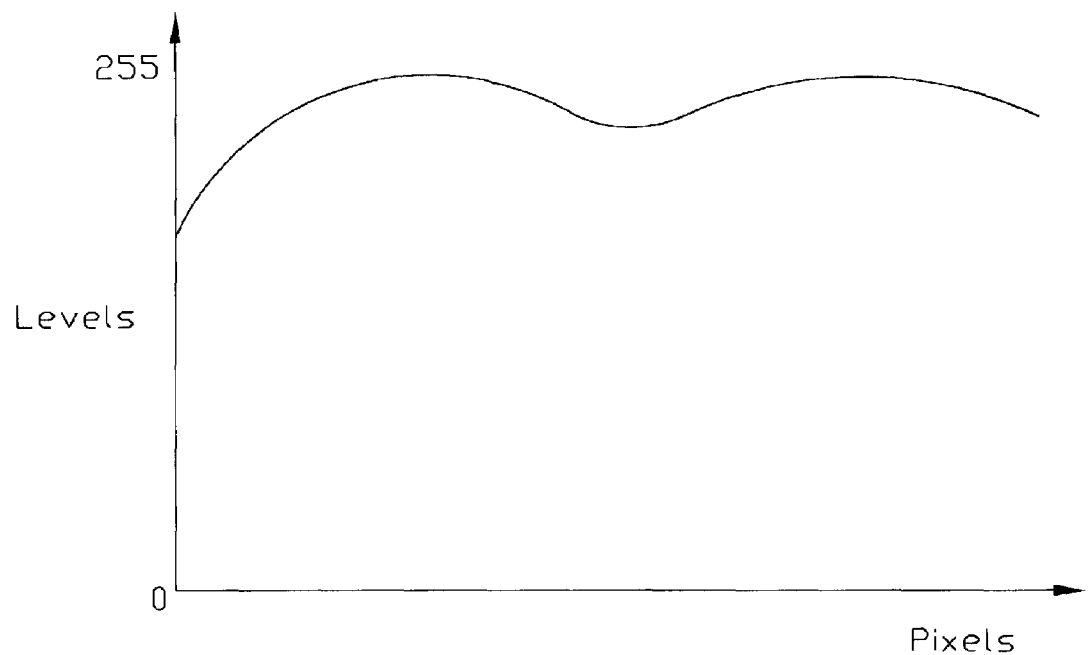
FIG. 1 shows a calibration curve of one image line.
Figure 2:
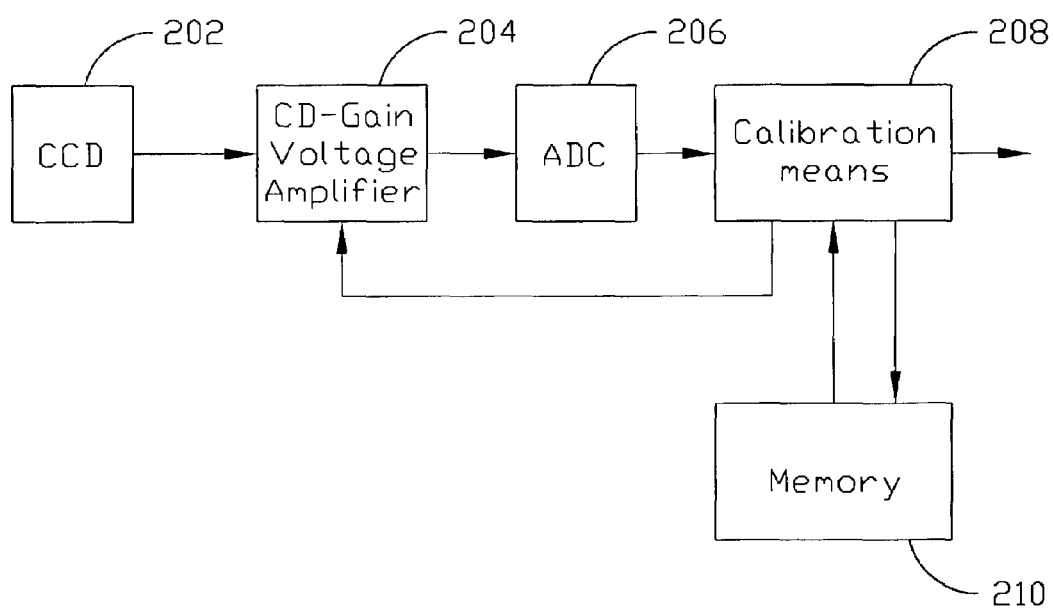
FIG. 2 shows a calibration functional block diagram of a in an image scanner.

Referring to FIG. 1, a calibration curve of how the bright levels of the generated image vary with pixel positions of one image line is shown. This curve is generated by scanning a total white calibration board to generate calibration data corresponding to each image sensor or CCD before scanning images formally. Normally, a calibration curve used to calibrate images is generated by selecting data of a plurality of image lines and averaging the data after scanning a calibration board. Referring to FIG. 2, a calibration functional block diagram of an image scanner of this invention is shown. A light beam reflected from the surface of a scanned calibration board exposes on CCD 202 and is then converted to voltage signals by CCD 202. The voltage signals are then adjusted by a DC gain voltage amplifier 204 and the adjusted voltage signals are next converted to digital signals by an analog-to-digital converter 206. The digital signals are then calculated to generate calibration data corresponding to each CCD sensor by a calibration means 208. The calibration data are then stored in memory 210.

Figure 3:
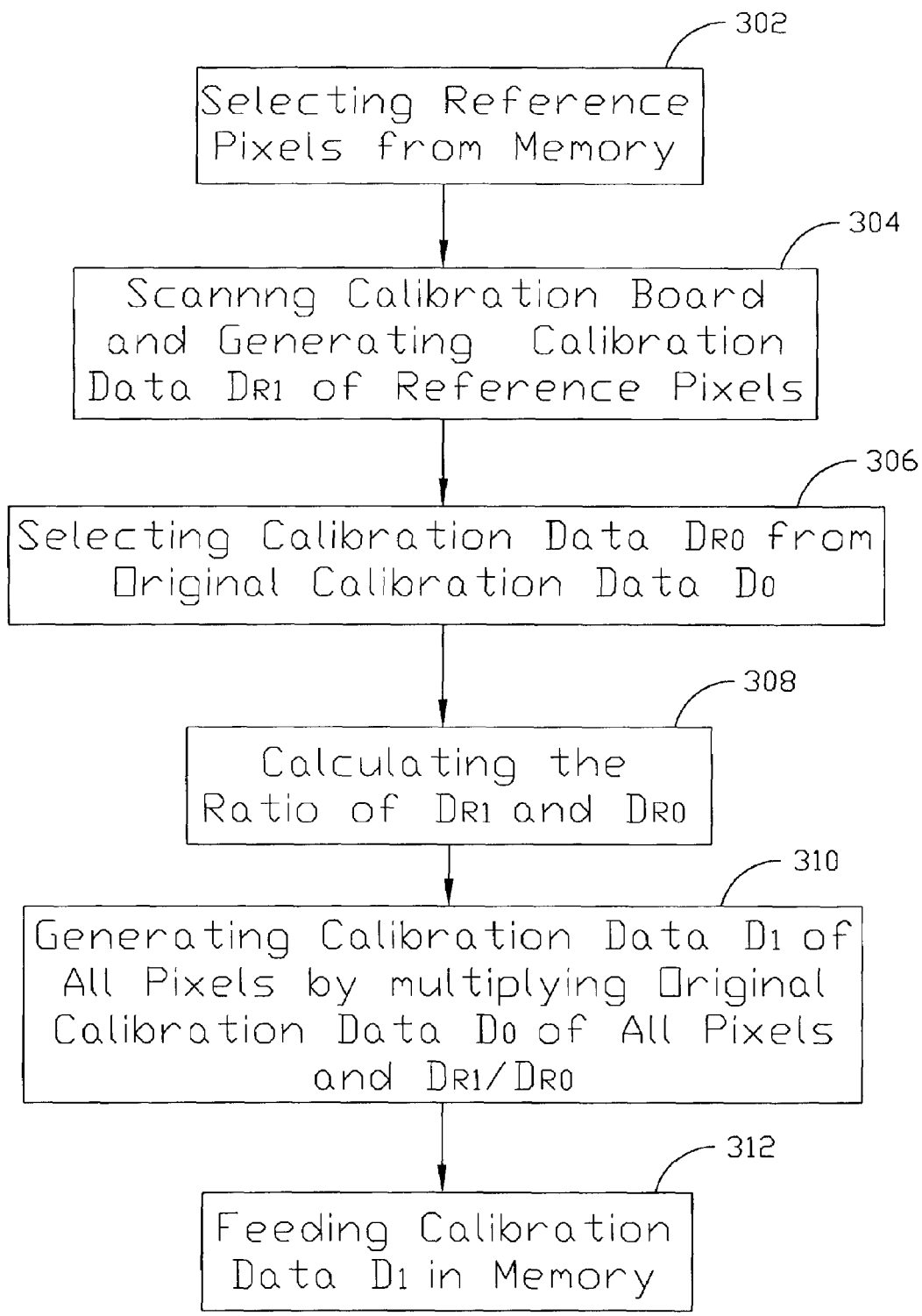
FIG. 3 shows a flow chart of this invention.
Figure 4:
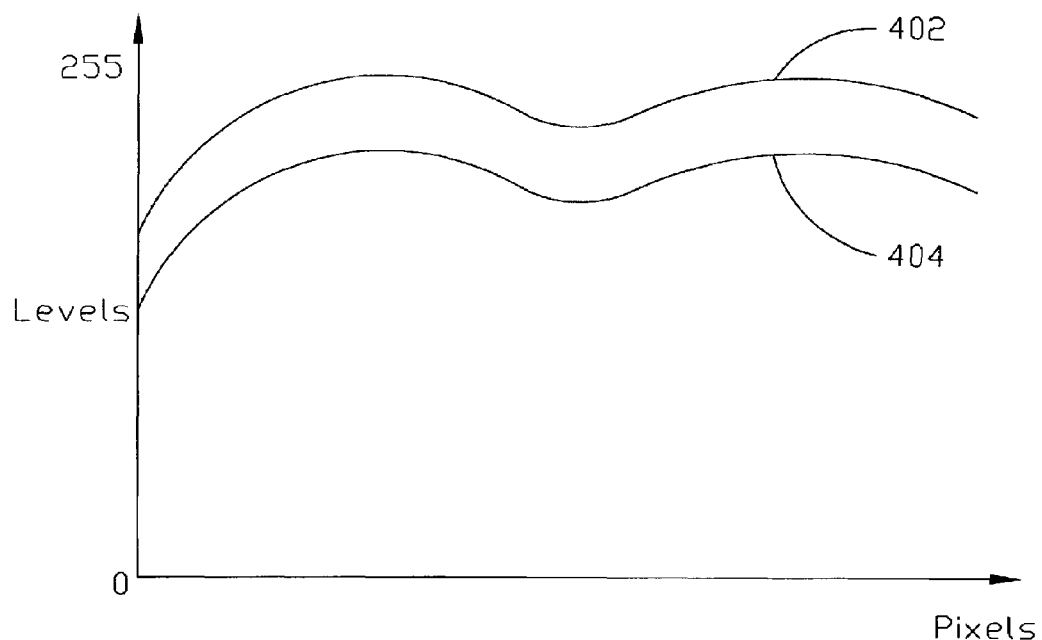
FIG. 4 shows the original calibration curve of the previous scan and a new calibration curve generated by the method of this invention.

FIG. 3 shows a flow chart of this invention. Before performing the method of this invention, a calibration curve and calibration data corresponding to every CCD image sensor of a previous scan must be established and stored in memory 210. As mentioned in the background of the invention, a total white calibration board or a full black calibration board is scanned to obtain the calibration curve showing how the bright level of the generated image varies with pixel positions of one image line. The data of this calibration curve are then used to calculate or to generate calibration data $D_o$ corresponding to each image sensor or CCD. This calibration data $D_o$ is stored in memory 210. When another image scan is going to be performed, a new calibration curve must be generated since the conditions of the components of an image scanner usually alter in every scanning. The method of this invention first selects several reference pixels of one image line instead of all pixels in step 302. Then a calibration board is scanned and calibration data $D_{R1}$ of the reference pixels are generated via the conventional process mentioned above in step 304. Next original calibration data $D_{R0}$ of the reference pixels are selected from calibration data $D_0$ by the calibration means 208 in step 306. The ratio of calibration data $D_{R1}$ of the reference pixels and original calibration data $D_{R0}$ of the reference pixels is calculated by the calibration means 208 in step 308. Calibration data $D_1$ of this scan corresponding to every CCD sensor can be generated by multiplying calibration data $D_0$ of all pixels and the ratio of $D_{R1}$ and $D_{R0}$ or $D_{R1}/D_{R0}$ by the calibration means 208 in step 310. For linear CCD sensors, the ratio of $D_{R1}$ and $D_{R0}$ or $D_{R1}/D_{R0}$ is a constant value. The calibration data $D_1$ are then fed in memory 210 from the calibration means 208 in step 312. A new calibration curve can be obtained by selecting 32 image lines (for example) and averaging calibration data $D_1$ of the 32 image lines. When formally scanning an image or a document, the light signals reflected from the image or document are received and converted to voltage signals by the CCD 202. The voltage signals are then adjusted by the DC gain voltage amplifier 204 and the adjusted voltage signals are next converted to digital signals by the analog-to-digital converter 206. When the digital signals are fed in the calibration means 208, the averaged calibration data $D_1$ are also accessed from memory 210 and a calibration process is performed by using the digital signals and the averaged calibration data $D_1$ to generate image signals for further image processing. FIG. 4 shows an original calibration curve 402 of the previous scan and a new calibration curve 404 generated by the method of this invention.

In another embodiment of this invention, the step 308 can be changed to calculating $D_{R0}/D_{R1}$ or the reciprocal of $D_{R1}/D_{R0}$ and the step 310 can be omitted. The reciprocal of $D_{R1}/D_{R0}$ or $D_{R0}/D_{R1}$ is then fed in the DC gain voltage amplifier 204 by the calibration means 208. When formally scanning an image or a document, the light signals reflected from the image or document are received and converted to voltage signals by the CCD 202. The voltage signals are then adjusted by the DC gain voltage amplifier 204 and the adjusted voltage signals corresponding each pixels multiply $D_{R0}/D_{R1}$ or the reciprocal of $D_{R1}/D_{R0}$. The adjusted voltage signals are next converted to digital signals by the analog-to-digital converter 206. The digital signals are fed in the calibration means 208 and a calibration process is performed to generate image signals for further image processing.

Figure 5:
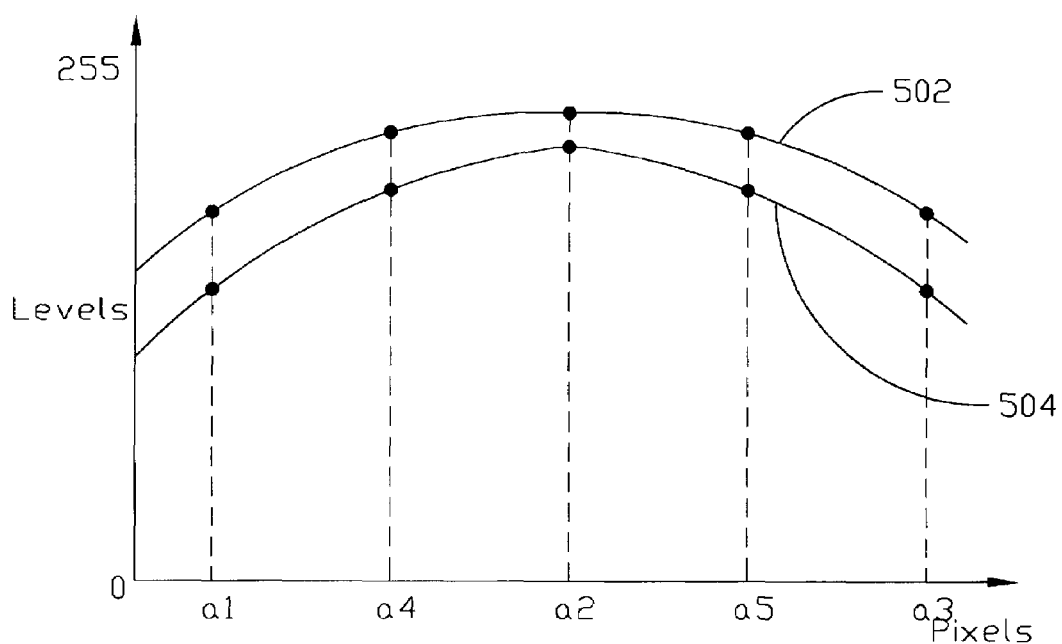
FIG. 5 shows the original calibration curve of the previous scan and a new calibration curve generated by the method of this invention.

However, for non-linear CCD sensors, the ratio of $D_{R1}$ and $D_{R0}$ or $D_{R1}/D_{R0}$ is not a constant value. The ratios of calibration data $D_{R1}$ and original calibration data $D_{R0}$ of the reference pixels obtained by the method mentioned above are used to calculate the ratio of calibration data $D_{R1}$ and original calibration data $D_{R0}$ of the pixel between two reference pixels by an interpolation method. FIG. 5 shows an original calibration curve 502 of the previous scan and a new calibration curve 504. As shown in FIG. 5, reference pixels $a_1$, $a_2$ and $a_3$ are selected and the calibration data $D_{R1-a1}$, $D_{R1-a2}$ and $D_{R1-a3}$ are generated by scanning a calibration board. The ratios of calibration data $D_{R1}$ and original calibration data $D_{R0}$ of the reference pixels $a_1$, $a_2$ and $a_3$ can be calculated by using the original calibration data $D_{R0-a1}$, $D_{R0-a2}$ and $D_{R0-a3}$, and the calibration data $D_{R1-a1}$, $D_{R1-a2}$ and $D_{R1-a3}$ of the reference pixels $a_1$, $a_2$ and $a_3$. The ratios of calibration data $D_{R1}$ and original calibration data $D_{R0}$ of the pixels $a_4$ and $a_5$ are calculated by an interpolation method. The ratios of calibration data $D_{R1}$ and original calibration data $D_{R0}$ of the rest of the pixels are calculated by an interpolation method so that a new calibration curve 504 can be obtained.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method for generating a calibration curve, said method comprising:
   providing calibration data of one image line of previous scan;
   selecting reference pixels of said image line;
   scanning a calibration board;
   generating calibration data of said reference pixels;
   selecting calibration data of said reference pixels of previous scan from said calibration data of said image line of previous scan;
   calculating ratios of said calibration data of said reference pixels and said calibration data of said reference pixels of previous scan; and
   generating calibration data of all pixels of said image line to form the calibration curve by using said ratios of said reference pixels.

2. The method according to claim 1, wherein said calibration board comprises a white calibration board.

3. The method according to claim 1, wherein said calibration board comprises a black calibration board.

4. The method according to claim 1, wherein said calibration data of said reference pixels are generated by converting light signals reflecting from said calibration board to analog voltage signals, adjusting said analog voltage signals, converting said analog voltage signals to digital voltage signals and calibrating said digital voltage signals.

5. The method according to claim 1, wherein said calibration data of all pixels of said image line are generated by multiplying said calibration data of said image line of previous scan and said ratios.

6. The method according to claim 1, when said ratios are not a constant value, said calibration data of all pixels of said image line are generated by an interpolation method.

7. A method for generating a calibration curve, said method comprising:
  providing calibration data of one image line of previous scan;
  selecting reference pixels of said image line;
  scanning a calibration board;
  generating calibration data of said reference pixels;
  selecting calibration data of said reference pixels of previous scan from said calibration data of said image line of previous scan;
  calculating ratios of said calibration data of said reference pixels of previous scan and said calibration data of said reference pixels;
  feeding said ratios in a gain voltage amplifier; and
  calibrating analog voltage signals of all pixels of said image line by said ratios in said gain voltage amplifier.

8. The method according to claim 7, wherein said calibration board comprises a white calibration board.

9. The method according to claim 7, wherein said calibration board comprises a black calibration board.

10. The method according to claim 7, wherein said calibration data of said reference pixels are generated by converting light signals reflecting from said calibration board to analog voltage signals, adjusting said analog voltage signals, converting said analog voltage signals to digital voltage signals and calibrating said digital voltage signals.

11. An apparatus for generating a calibration curve, said apparatus comprising:
  a charge-coupled device, said charge-coupled device receives light signals and converts said light signals to analog voltage signals;
  a direct current gain voltage amplifier, said direct current gain voltage amplifier receives and adjusts said analog voltage signals;
  an analog-to-digital converter receives and converts said adjusted analog voltage signals to digital voltage signals;
  a calibration means, said calibration means receives and calibrates said digital voltage signals; and
  a memory, said memory stores said calibrated digital voltage signals from said calibration means, wherein said calibration means selects calibration data of reference pixels of previous scan from said memory, calculates ratios of calibration data of reference pixels and calibration data of reference pixels of previous scan, stores said ratios in said memory and multiplies said ratios and calibration data of all pixels of previous scan to generate calibration data of all pixels.

12. An apparatus for generating a calibration curve, said apparatus comprising:
  a charge-coupled device, said charge-coupled device receives light signals and converts said light signals to analog voltage signals;
  a direct current gain voltage amplifier, said direct current gain voltage amplifier receives and adjusts said analog voltage signals;
  an analog-to-digital converter receives and converts said adjusted analog voltage signals to digital voltage signals;
  a calibration means, said calibration means receives and calibrates said digital voltage signals; and
  a memory, said memory stores said calibrated digital voltage signals from said calibration means, wherein said calibration means selects calibration data of reference pixels of previous scan from said memory, calculates ratios of calibration data of reference pixels of previous scan and calibration data of reference pixels, feeds said ratios back to said direct current gain voltage amplifier.

* * * * *